US010079552B2

(12) United States Patent
Kadota

(10) Patent No.: US 10,079,552 B2
(45) Date of Patent: Sep. 18, 2018

(54) POWER CONVERSION DEVICE

(71) Applicant: FUJI ELECTRIC CO., LTD., Kawasaki (JP)

(72) Inventor: Yasunobu Kadota, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 15/790,805

(22) Filed: Oct. 23, 2017

(65) Prior Publication Data

US 2018/0183350 A1   Jun. 28, 2018

(30) Foreign Application Priority Data

Dec. 22, 2016   (JP) ................................. 2016-249705

(51) Int. Cl.
*H02M 7/483*   (2007.01)
*H02M 7/00*    (2006.01)

(52) U.S. Cl.
CPC ........... *H02M 7/003* (2013.01); *H02M 7/483* (2013.01)

(58) Field of Classification Search
CPC ........ H02M 7/003; H02M 7/04; H02M 7/155; H02M 7/19; H02M 7/217; H02M 7/25; H02M 7/44; H02M 7/483
See application file for complete search history.

(56) References Cited

U.S. PATENT DOCUMENTS

| 5,365,424 A * | 11/1994 | Deam .................... H01L 23/52 174/72 B |
| 9,143,049 B2 | 9/2015 | Koyanagi et al. |
| 2012/0205983 A1 | 8/2012 | Koyanagi et al. |
| 2013/0271941 A1* | 10/2013 | Guan ...................... H05K 7/18 361/811 |
| 2013/0322141 A1* | 12/2013 | Kobayashi ............ H02M 7/003 363/123 |
| 2015/0256096 A1* | 9/2015 | Nishizawa ............... H01G 2/04 363/131 |

FOREIGN PATENT DOCUMENTS

WO   WO 2011/061813 A1   5/2011

* cited by examiner

*Primary Examiner* — Matthew Nguyen

(57) ABSTRACT

A power conversion device including: a first capacitor and a second capacitor which are connected to each other in series; a plurality of first power semiconductor modules having terminals disposed on one surface; a plurality of second power semiconductor modules having terminals disposed on one surface; and a laminated bus bar connecting the first capacitor and the second capacitor and the plurality of modules, wherein the first power semiconductor modules and the second power semiconductor modules are disposed in such a manner that their respective output terminals face each other in a disposition direction of the terminals, and in the laminated bus bar, an output bus bar connecting the output terminals of the first power semiconductor modules and the second power semiconductor modules to each other is held in an insulated manner in an opening portion provided to the intermediate bus bar.

9 Claims, 15 Drawing Sheets

POWER CONVERSION DEVICE

CROSS REFERENCE TO RELATED APPLICATIONS AND INCORPORATION BY REFERENCE

This application claims benefit of priority under 35 USC 119 based on Japanese Patent Application No. 2016-249705 filed on Dec. 22, 2016, the entire contents of which are incorporated by reference herein.

TECHNICAL FIELD

The present invention relates to a power conversion device configured by connecting a plurality of power semiconductor modules having different incorporated element configurations to each other.

BACKGROUND ART

As a power conversion device of this type, for example, there has been proposed a three-level power conversion device in which a power conversion circuit for one phase includes electrolytic capacitors which serve as a direct current power supply, an insulated gate bipolar transistor (IGBT) module having a 2-in-1 configuration in which a first IGBT to which a free-wheeling diode is connected in reverse parallel and a second IGBT to which a free-wheeling diode is connected in reverse parallel in a similar manner are connected to each other in series and housed in one package, and one or a plurality of bi-directional switch modules which house in a package a bi-directional switch having a property of allowing the current to flow in a bi-directional manner. (e.g., see WO 2011/061813).

In a conventional technique as disclosed in WO 2011/061813, the IGBT module and the bi-directional switch module which constitute the power conversion circuit for one phase are electrically connected to each other by laminated conductors having a flat plate shape. These laminated conductors are configured to have a three-layer wiring structure having a P conductor, an N conductor, and a wiring conductor for the bi-directional switch which is disposed between these P conductor and N conductor and divided into three pieces or two pieces.

SUMMARY OF INVENTION

In the above conventional technique as disclosed in WO 2011/061813, the wiring conductor for the bi-directional switch is divided on the same plane so that a three-layer structure is configured, whereby, with the wiring structure having a small number of layers, a wiring inductance between the direct current power supply and the module can be reduced and the three-level power conversion device which is small and inexpensive can be realized.

However, in the above conventional technique, there is no problem in a case in which an output arm is constituted by one insulated gate bipolar transistor (IGBT) module and one or two bi-directional switch portions which are connected to each other in parallel, but there has been a problem in that in a case in which an output arm is constituted by a plurality of IGBT modules and a plurality of bi-directional switch portions to increase a current capacity, connecting the plurality of IGBT modules and the plurality of bi-directional switch portions to each other in parallel requires a width of each conductor to be large so that demand for reduction in size cannot be satisfied.

Thus, the present invention has been made in view of the problem of the above conventional example, and has an object to provide a power conversion device which can be reduced in size while reducing a wiring inductance when a plurality of modules having different incorporated element configurations are connected to each other.

In order to achieve the object mentioned above, according to an aspect of the present invention, there is provided a power conversion device including: a first capacitor and a second capacitor which are connected to a direct current power supply in series; a plurality of first power semiconductor modules incorporating a series circuit of a first semiconductor device and a second semiconductor device in which a positive electrode terminal, a negative electrode terminal, and an output terminal are disposed on one surface; a plurality of second power semiconductor modules incorporating a bi-directional semiconductor device in which an intermediate terminal and an output terminal are disposed on one surface; and a laminated bus bar connecting terminals of the first capacitor and the second capacitor and the terminals of the plurality of first power semiconductor modules and the plurality of second power semiconductor modules, wherein the first power semiconductor modules and the second power semiconductor modules are disposed in such a manner that the respective output terminals face each other in a disposition direction of the terminals, the laminated bus bar is formed by laminating a positive electrode bus bar which connects the first capacitor and the positive electrode terminals of the first power semiconductor modules to a positive electrode of the direct current power supply, the negative electrode bus bar which connects the second capacitor and the negative electrode terminals of the first power semiconductor modules to a negative electrode of the direct current power supply, and an intermediate bus bar which connects connection points of the first capacitor and the second capacitor and the intermediate terminals of the second power semiconductor modules, with the insulation films respectively therebetween, and an output bus bar connecting the output terminals of the first power semiconductor modules and the second power semiconductor modules to each other is held in an insulated manner in an opening portion provided to the intermediate bus bar.

According to an aspect of the present invention, in a state in which the first power semiconductor modules and the second power semiconductor modules are disposed in such a manner that their respective output terminals face each other in a disposition direction of the output terminals, the output bus bar is held in an insulated manner in an opening portion provided to the intermediate bus bar constituting the laminated bus bar connecting respective terminals of the direct current power supply, the first capacitor and the second capacitor, the first power semiconductor modules and the second power semiconductor modules so that an entire configuration can be reduced in size while a three-layer structure is maintained.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 4A and 4B are cross-sectional views of FIG. 1, in which FIG. 4A is a cross-sectional view taken along the line IV-IV of FIG. 1, and FIG. 4B is an enlarged cross-sectional view of an X portion of FIG. 4A;

FIGS. 5A and 5B are perspective views illustrative of a laminate bus bar, in which FIG. 5A is a perspective view illustrative of an entire configuration of the laminate bus bar, and FIG. 5B is an exploded perspective view of the laminate bus bar;

FIGS. 11A and 11B are perspective views illustrative of another modification example of the three-level three-phase power conversion device of the present invention, in which FIG. 11A is a perspective view illustrative of an entire configuration of the laminate bus bar, and FIG. 11B is an exploded perspective view of the laminate bus bar;

DETAILED DESCRIPTION

Next, embodiments of the present invention will be described with reference to the drawings. In the following description of the drawings, the same or similar portions are assigned the same or similar reference signs. However, the drawings are schematic, and it should be noted that a relationship between a thickness and a planar dimension, a ratio of a thickness of each of layers, and the like are different from actual values. Hence, specific thicknesses and dimensions should be determined in consideration of the following description. Moreover, it is possible that portions different in mutual dimensional relationships and ratios are shared also among the drawings.

Further, the embodiments as described below are to illustrate a device or a method for embodying the technical idea of the present invention, and the technical idea of the present invention is not to specify a material, a shape, a configuration, a disposition, and the like of a constituting component as those described below. The technical idea of the present invention can be modified in various ways within the technical scope as set forth in the claims appended hereto.

First, an embodiment of a power conversion device according to one aspect of the present invention will be described.

First of all, a first power semiconductor module PM1 and a second power semiconductor module PM2 to which the present invention can be applied will be described.

Figure 6:
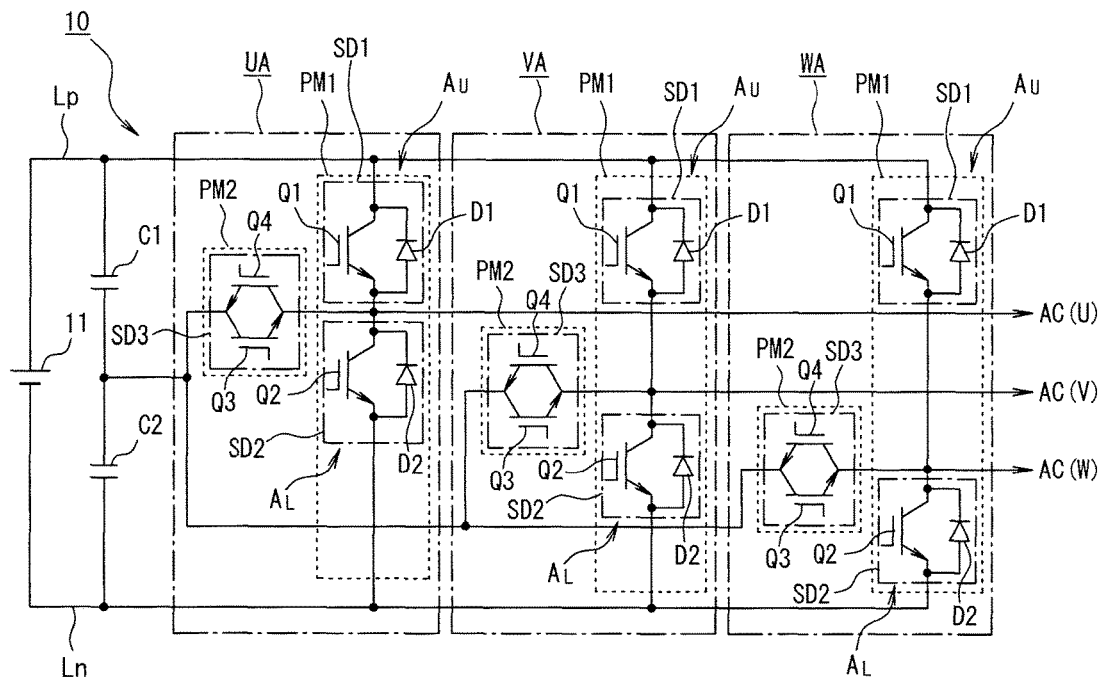
FIG. 6 is a circuit diagram illustrative of an equivalent circuit diagram of FIG. 1.

As illustrated in FIG. 6, the first power semiconductor module PM1 includes a 2-in-1 module in which a first semiconductor device SD1 constituting an upper arm AU and a second semiconductor device SD2 constituting a lower arm AL are connected to each other in series. Herein, the first semiconductor device SD1 includes a semiconductor switching element Q1, such as an insulated gate bipolar transistor (IGBT) or a power metal oxide semiconductor field effect transistor (MOSFET), and a free-wheeling diode D1 connected to this switching element Q1 in reverse parallel.

Similarly, the second semiconductor device SD2 also includes a switching element Q2, such as an insulated gate bipolar transistor (IGBT) or a power MOSFET, and a free-wheeling diode D2 connected to this switching element Q2 in reverse parallel.

Figure 1:
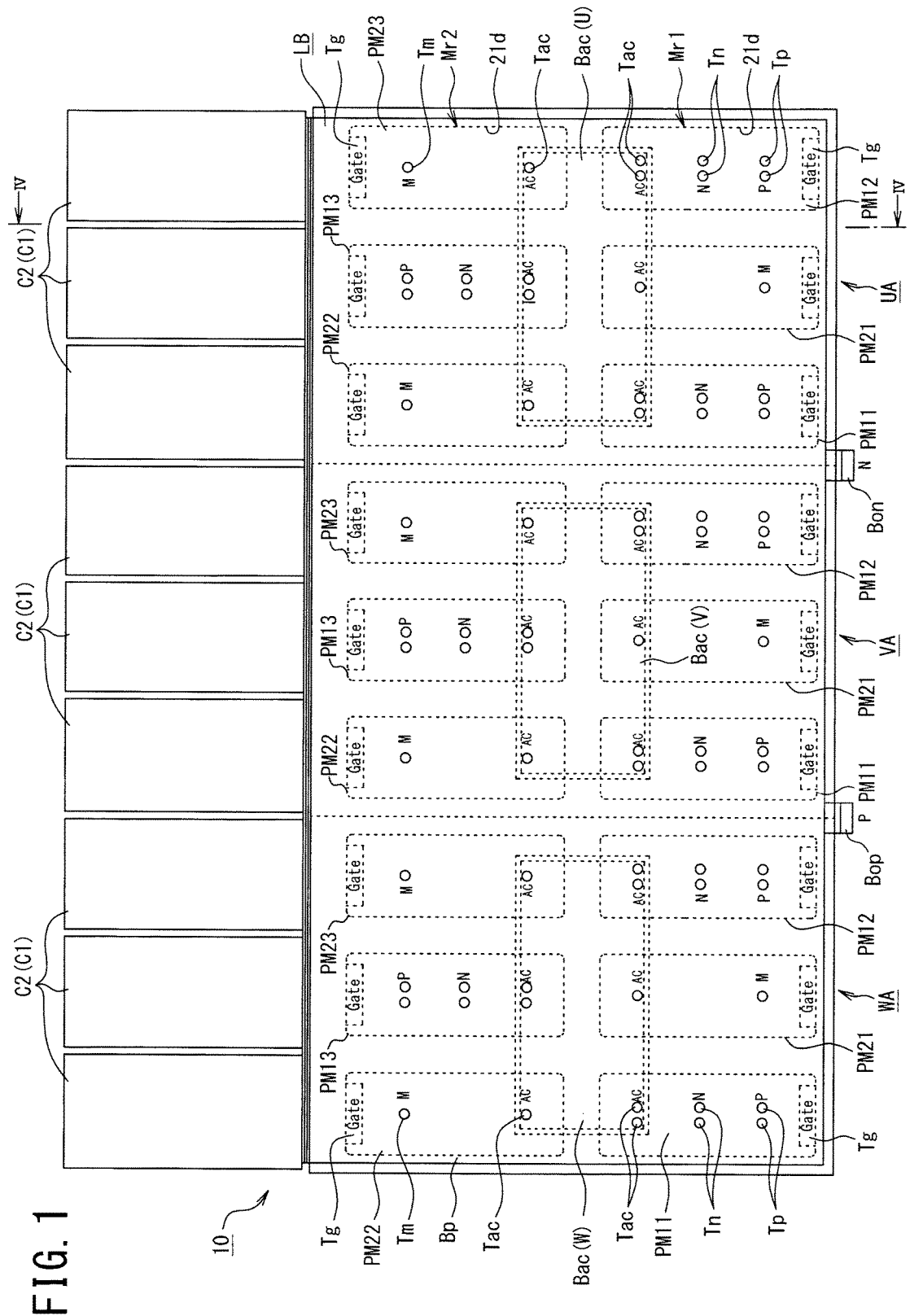
FIG. 1 is a plan view illustrative of a first embodiment of a power conversion device of the present invention.
Figure 2:
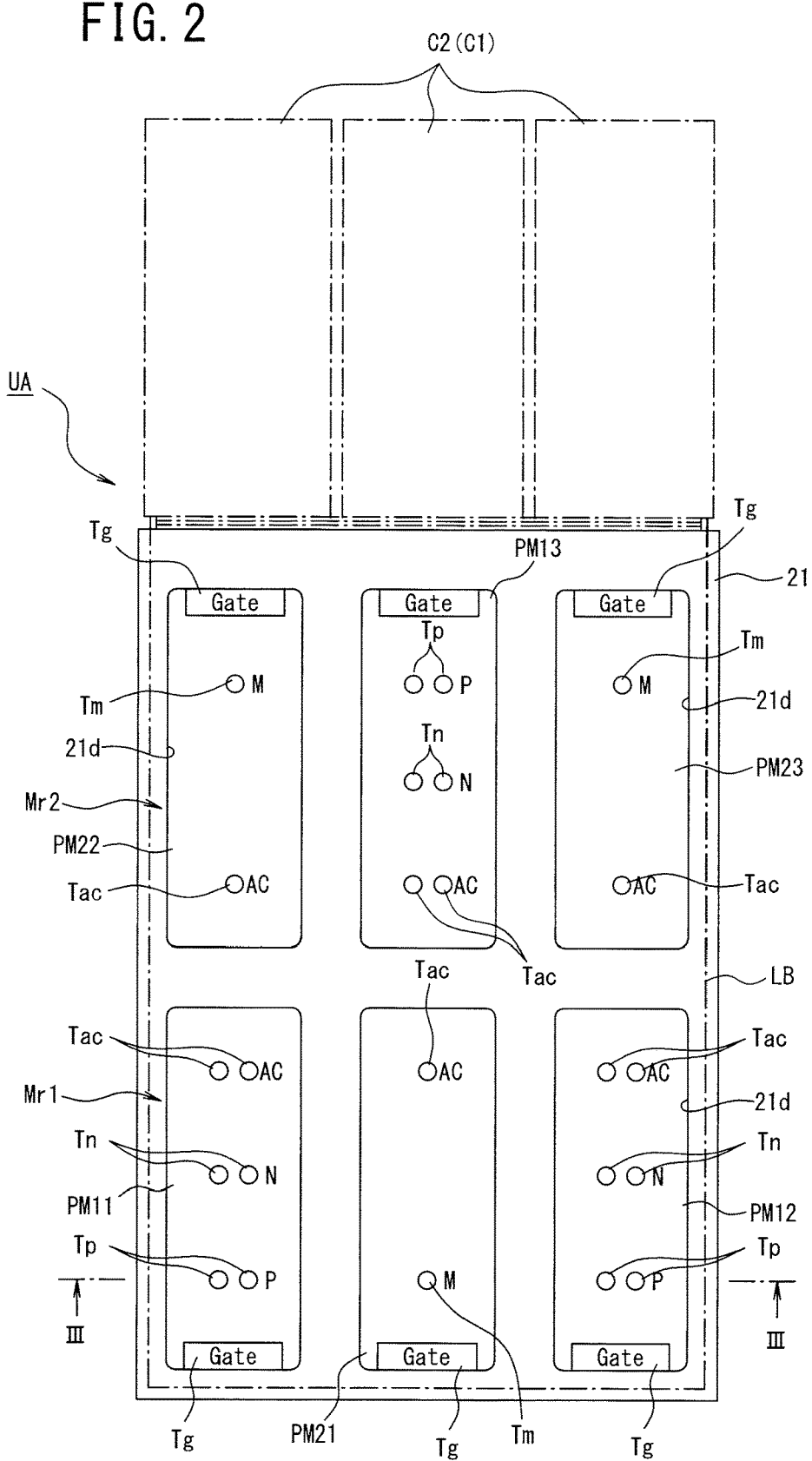
FIG. 2 is an enlarged plan view illustrative of a U-phase output arm.
Figure 3:
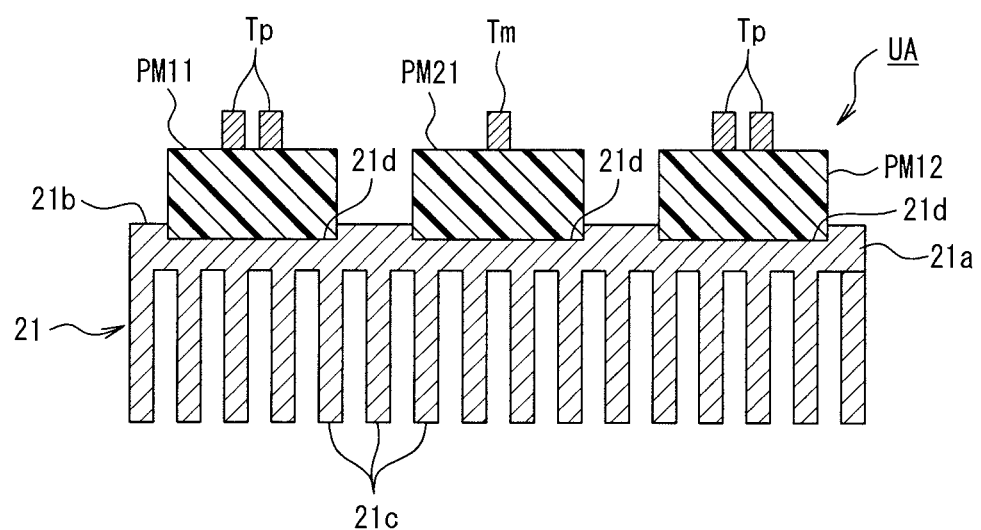
FIG. 3 is a cross-sectional view taken along the line of FIG. 2.

As illustrated in FIGS. 1 to 3, this first power semiconductor module PM1 is a mold molded product in which the first semiconductor device SD1 and the second semiconductor device SD2 as described above and a wiring board (unillustrated) which electrically connects the same are covered with a mold resin.

Moreover, in the first power semiconductor module PM1, on a front surface from one end side toward the other end side, there are disposed a pair of positive electrode terminals Tp having a pin shape and connected to a positive electrode of a direct current power supply, a negative electrode terminal Tn connected to a negative electrode of the direct current power supply, and an alternating current output terminal Tac connected to a load in this order with an identical inter-terminal distance therebetween.

Further, at an opposite side of the positive electrode terminals Tp to the negative electrode terminal Tn, there is provided a gate terminal Tg which supplies a gate signal separately to the first semiconductor device SD1 and the second semiconductor device SD2. Herein, the positive electrode terminals Tp, the negative electrode terminal Tn, and the alternating current output terminal Tac are each designed to be two terminals having a pin-shape and formed to project with a predetermined space therebetween in a width direction.

Moreover, as illustrated in FIG. 6, the second power semiconductor module PM2 includes a bi-directional semiconductor device SD3 in which two reverse blocking IGBTs Q3, Q4 are connected to each other in reverse parallel. As illustrated in FIGS. 1 to 3, this second power semiconductor module PM2 is a mold molded product in which the reverse blocking IGBTs Q3, Q4 and a wiring board which electrically connects the same are covered with a mold resin.

Furthermore, in the second power semiconductor module PM2, on a front surface, an intermediate terminal Tm is formed to project at one end side, the alternating current output terminal Tac is formed to project at the other end side, and the gate terminal Tg which supplies a gate signal separately to the reverse blocking IGBTs Q3, Q4 is formed to project at an opposite side of the intermediate terminals Tm to the alternating current output terminal Tac. Herein, the intermediate terminal Tm and the alternating current output terminal Tac are each designed to be one terminal having a pin-shape and formed to project at a center portion in a width direction.

The first power semiconductor module PM1 and the second power semiconductor module PM2 are formed to have an identical size, and the intermediate terminal Tm and the alternating current output terminal Tac of the second power semiconductor module PM2 are formed at positions corresponding to the positive electrode terminal Tp and the alternating current output terminal Tac of the first power semiconductor module PM1.

In the first power semiconductor module PM1 and the second power semiconductor module PM2, on a rear surface, there is desirably provided a heat dissipation plate which dissipates generated heat of the semiconductor devices in the power semiconductor module to the exterior.

Next, a three-level three-phase power conversion device using the first power semiconductor module PM1 and the second power semiconductor module PM2 will be described.

As illustrated in FIG. 6, in this three-level three-phase power conversion device 10, between a positive electrode line Lp connected to the positive electrode of the direct current power supply 11 and a negative electrode line Ln connected to the negative electrode of the direct current power supply 11, a series circuit of a first capacitor C1 and a second capacitor C2, a U-phase output arm UA, a V-phase output arm VA, and a W-phase output arm WA are connected to each other in parallel.

As illustrated in FIG. 6, a basic configuration of the U-phase output arm UA, the V-phase output arm VA, and the W-phase output arm WA includes one set of the first power semiconductor module PM1 and the second power semiconductor module PM2.

In other words, in the first power semiconductor module PM1, between the positive electrode line Lp and the negative electrode line Ln, the first semiconductor device SD1 and the second semiconductor device SD2 are connected to each other. Moreover, in the second power semiconductor module PM2, the bi-directional semiconductor device SD3 is connected between a connection point between the first semiconductor device SD1 and the second semiconductor device SD2 and a connection point between the first capacitor C1 and the second capacitor C2.

Figure 7:
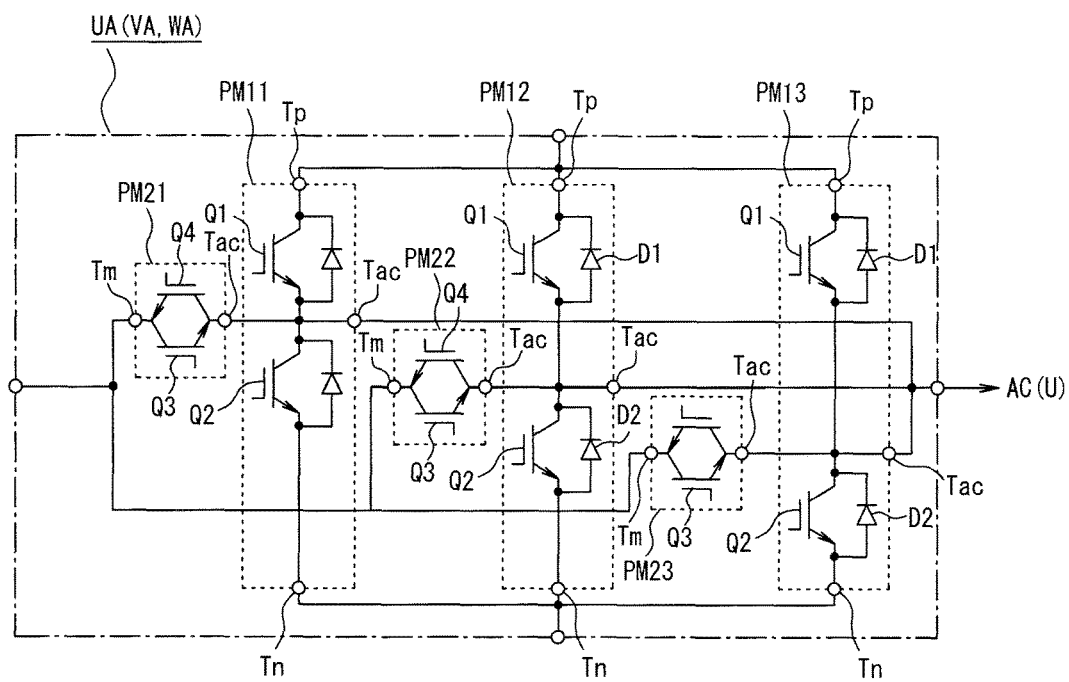
FIG. 7 is a circuit diagram illustrative of the equivalent circuit diagram of the U-phase output arm of FIG. 6.

Then, as illustrated in FIG. 7, each of the U-phase output arm UA, the V-phase output arm VA, and the W-phase output arm WA is configured to connect a plurality of sets, for example, three sets of the first power semiconductor module PM1 and the second power semiconductor module PM2 to each other in parallel in order to secure a required load current in a case in which the load current required by a load fails to be supplied by one set of the first power semiconductor module PM1 and the second power semiconductor module PM2.

Thus, in a case in which each of the U-phase output arm UA, the V-phase output arm VA, and the W-phase output arm WA includes a plurality of sets of the first power semiconductor module PM1 and the second power semiconductor module PM2, as illustrated in FIG. 1, on a cooling body 21 including cooling fins or cooling pins, there are disposed three sets of the first power semiconductor modules PM11 to PM13 and the second power semiconductor modules PM21 to PM23, respectively.

Herein, the cooling body 21 is made of a metal member having a high thermal conductivity, such as aluminum and copper. This cooling body 21 includes a module-mounting plate portion 21a and, at an opposite side of this module-mounting plate portion 21a to a module-mounting surface 21b, a multitude of heat dissipation fins 21c formed to project downward.

As illustrated in FIG. 3, in the module-mounting plate portion 21a, to the module-mounting surface 21b, there are provided six recessed portions 21d with a small depth in total, in which three pieces are provided in a left-right direction at two rows at the front and the back, that position three sets of the first power semiconductor modules PM11 to PM13 and the second power semiconductor modules PM21 to PM23, respectively.

As illustrated in FIG. 2 in an enlarged manner, in the U-phase output arm UA, in the recessed portions 21d at the front row, there are disposed in parallel from left the first power semiconductor module PM11, the second power semiconductor module PM21, and the first power semiconductor module PM12 in this order in such a manner that respective side surfaces face each other with a predetermined space so that a first module row Mr1 is configured.

Moreover, in the recessed portions 21d at the back row, there are disposed in parallel from left the second power semiconductor module PM22, the first power semiconductor module PM13, and the second power semiconductor module PM23 in this order in such a manner that respective side surfaces face each other with a predetermined space so that a second module row Mr2 is configured.

Herein, the first power semiconductor modules PM11, PM12 at the first module row Mr1 are disposed in such a manner that the gate terminal Tg is at a front end side and the alternating current output terminals Tac are at a back end side. Moreover, the second power semiconductor module PM21 at the first module row Mr1 is disposed in such a manner that the gate terminal Tg is at the front end side and the alternating current output terminal Tac is at the back end side.

The first power semiconductor module PM13 at the second module row Mr2 is disposed in such a manner that the gate terminal Tg is at the back end side and the alternating current output terminals Tac are at the front end side. Moreover, the second power semiconductor modules PM22, PM23 at the second module row Mr2 are disposed in such a manner that the gate terminal Tg is at the back end side and the alternating current output terminal Tac is at the front end side.

Thus, at the module-mounting plate portion 21a of the cooling body 21, the first power semiconductor modules PM11 to PM13 and the second power semiconductor modules PM21 to PM23 are disposed in an alternately staggered manner in plan view in such a manner that the second power semiconductor modules PM21 to PM23 face the first power semiconductor modules PM11 to PM13 in a front-back direction.

The V-phase output arm VA and the W-phase output arm WA are also provided with the first module row Mr1 and the second module row Mr2 having a disposition similar to that of the U-phase output arm UA, and an alternately staggered disposition in plan view is made in such a manner that the second power semiconductor modules PM21 to PM23 face the first power semiconductor modules PM11 to PM13 in the front-back direction.

Figure 4A:
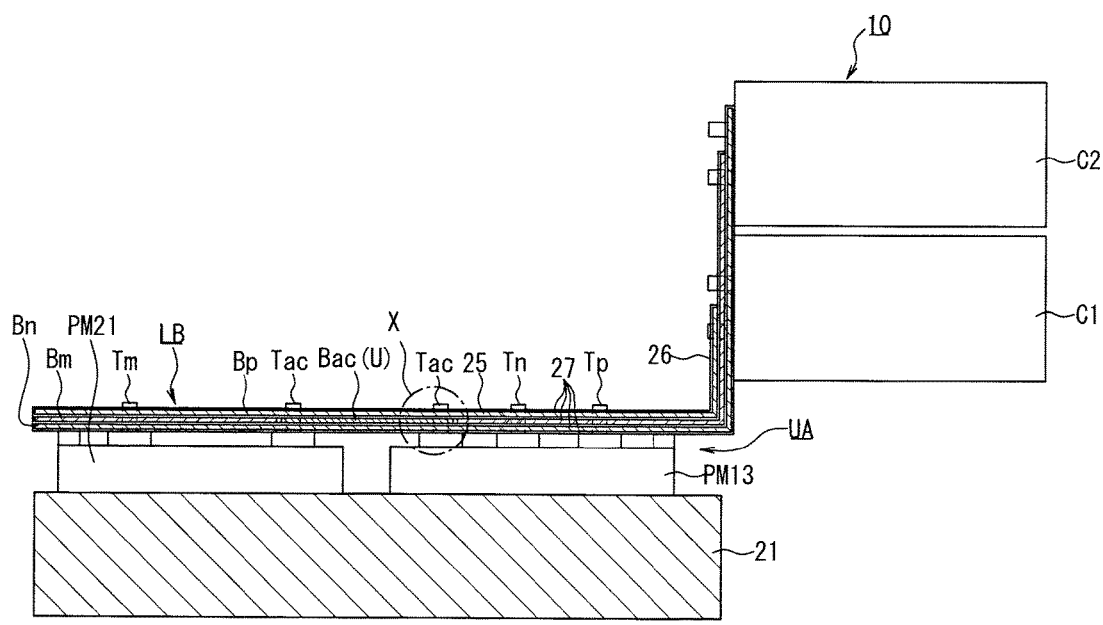
Figure 4B:
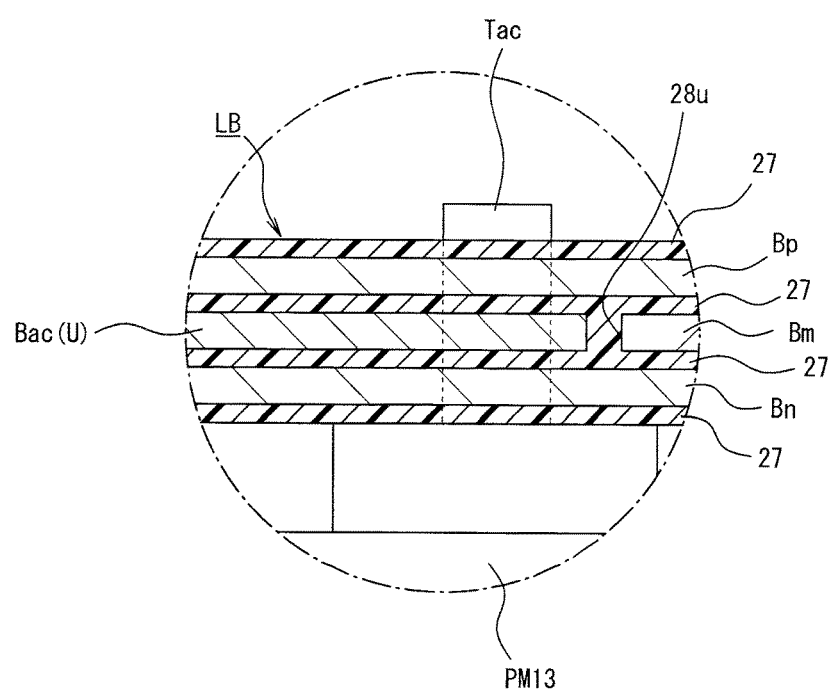

Then, as illustrated in FIGS. 4A and 4B, terminals Tp, Tn, Tac of the first power semiconductor modules PM11 to PM13 in the U-phase output arm UA are electrically connected to a positive electrode bus bar Bp, a negative electrode bus bar Bn, and an alternating current output bus bar Bac(U), respectively, and terminals Tm, Tac of the second power semiconductor modules PM21 to PM23 are electrically connected to an intermediate bus bar Bm and the alternating current output bus bar Bac(U), respectively.

Also in the V-phase output arm VA and the W-phase output arm WA, terminals Tp, Tn, Tac of the first power semiconductor modules PM11 to PM13 are electrically connected to the positive electrode bus bar Bp, the negative electrode bus bar Bn, and alternating current output bus bars Bac(V), Bac(W), respectively, and terminals Tm, Tac of the second power semiconductor modules PM21 to PM23 are electrically connected to the intermediate bus bar Bm and the alternating current output bus bars Bac(V), Bac(W), respectively.

Figure 5A:
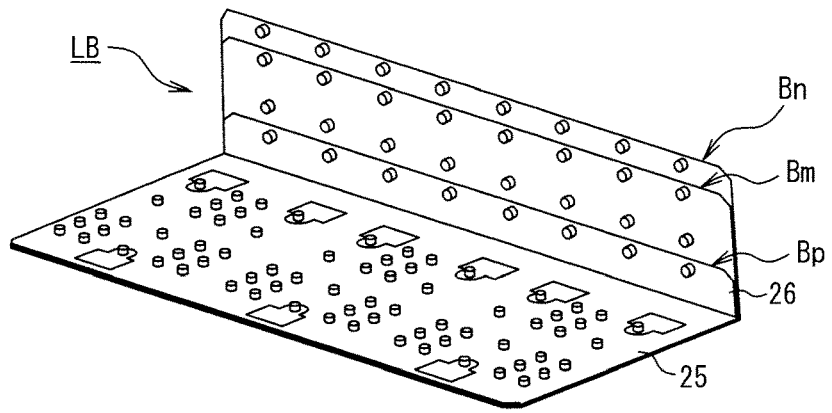
Figure 5B:
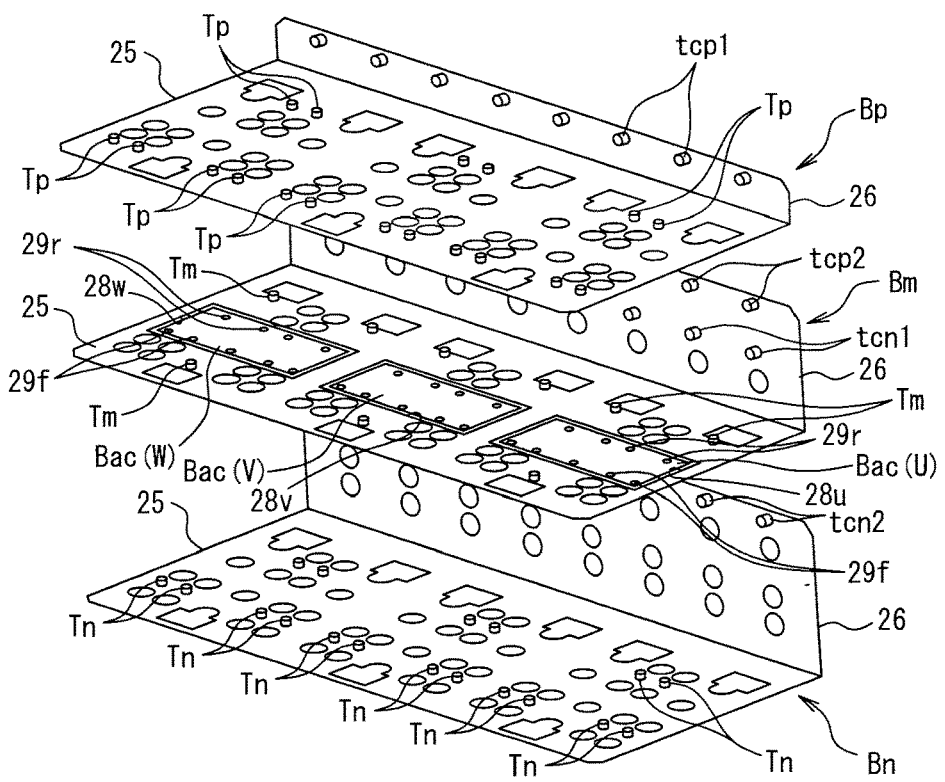

Herein, as illustrated in FIGS. 5A and 5B, each of the positive electrode bus bar Bp, the negative electrode bus bar Bn, and the intermediate bus bar Bm is formed to have a L-shaped cross section using a module-connecting flat plate portion 25 having such a size as to cover the cooling body 21 of the U-phase output arm UA, the V-phase output arm VA, and the W-phase output arm WA and a capacitor-connecting bent portion 26 bent upward from a back end portion of this module-connecting flat plate portion 25.

Then, on the U-phase output arm UA, the V-phase output arm VA, and the W-phase output arm WA, there are laminated the negative electrode bus bar Bn, the intermediate bus bar Bm, and the positive electrode bus bar Bp from a lower side in this order with an insulation film 27 as an insulation member, respectively therebetween so that a laminate bus bar LB as a laminated bus bar as illustrated in FIG. 5A is formed.

Herein, in the module-connecting flat plate portion 25 of the positive electrode bus bar Bp, insertion holes provided at positions corresponding to the positive electrode terminals Tp of the first power semiconductor modules PM11 to PM13 are configured to have such a size as to allow the positive electrode terminals Tp to be inserted thereinto to be electrically connected, and through holes provided at positions corresponding to the other terminals are configured to have such a size as to allow the negative electrode terminal Tn, the alternating current output terminals Tac, and the intermediate terminals Tm to be inserted thereinto without coming into contact therewith.

In the module-connecting flat plate portion 25 of the negative electrode bus bar Bn, insertion holes provided at positions corresponding to the negative electrode terminals Tn of the first power semiconductor modules PM11 to PM13 are configured to have such a size as to allow the negative electrode terminals Tn to be inserted thereinto to be electrically connected, and through holes provided at positions corresponding to the other terminals are configured to have such a size as to allow the positive electrode terminals Tp, the alternating current output terminals Tac, and the intermediate terminals Tm to be inserted thereinto without coming into contact therewith.

In the module-connecting flat plate portion 25 of the intermediate bus bar Bm, insertion holes provided at positions corresponding to the intermediate terminals Tm of the second power semiconductor modules PM21 to PM23 are configured to have such a size as to allow the intermediate terminals Tm to be inserted thereinto to be electrically connected, and through holes provided at positions corresponding to the other terminals are configured to have such a size as to allow the positive electrode terminals, the negative electrode terminal Tn, and the alternating current output terminals Tac to be inserted thereinto without coming into contact therewith.

In the alternating current output bus bars Bac1(U) to Bac1(W) and the Bac2(U) to Bac2(W), insertion holes provided at positions corresponding to the alternating current output terminals Tac of the first power semiconductor modules PM11 to PM13 and the second power semiconductor modules PM21 to PM23 are configured to have such a size as to allow each of the alternating current output terminals Tac to be inserted thereinto to be electrically connected.

Further, the capacitor-connecting bent portions 26 of the positive electrode bus bar Bp, the intermediate bus bar Bm, and the negative electrode bus bar Bn are laminated in this order with the insulation film 27 as an insulation member, respectively therebetween. The capacitor-connecting bent portions 26 of these positive electrode bus bar Bp, intermediate bus bar Bm, and negative electrode bus bar Bn are configured to have a height greater in this order.

Then, the capacitor-connecting bent portion 26 of the positive electrode bus bar Bp is provided with such through holes as to allow positive electrode terminals tcp1 of a plurality of first capacitors C1 constituted by, for example, an aluminum electrolytic capacitor to be inserted thereinto to be electrically connected.

The capacitor-connecting bent portion 26 of the intermediate bus bar Bm is provided with such through holes as to allow the positive electrode terminals tcp1 of the first capacitors C1 to be inserted thereinto without coming into contact therewith and such through holes as to allow positive electrode terminals tcp2 of a plurality of second capacitors C2 constituted by, for example, an aluminum electrolytic capacitor, and negative electrode terminals tcn1 of the first capacitors C1 to be inserted thereinto to be electrically connected.

The capacitor-connecting bent portion 26 of the negative electrode bus bar Bn is provided with such through holes as to allow the positive electrode terminals tcp1 and the negative electrode terminals tcn1 of the first capacitors C1 and the positive electrode terminals tcp2 of the second capacitors C2 to be inserted thereinto without coming into contact therewith and such through holes as to allow negative electrode terminals tcn2 of the second capacitors C2 to be inserted thereinto to be electrically connected.

Moreover, as illustrated in FIG. 5B, the alternating current output bus bars Bac(U), Bac(V), Bac(W) are disposed in an insulated manner in opening portions 28u, 28v, 28w, respectively, having, for example, a rectangular shape and formed at positions corresponding to the output terminals Tac of the first power semiconductor modules PM11 to PM13 and the output terminals Tac of the second power semiconductor modules PM21 to PM23 in such a manner as to surround each output terminal Tac.

In other words, as illustrated in FIG. 1, the alternating current output bus bar Bac(U) is made of a conductive flat plate having a rectangular shape, and at a front end side, there are provided insertion holes 29f into which the output terminals Tac of the first power semiconductor module PM11, the second power semiconductor module PM21, and the first power semiconductor module PM12 are inserted in a fitting manner. Moreover, in the alternating current output bus bar Bac(U), at a back end side, there are provided insertion holes 29r into which the output terminals Tac of the second power semiconductor module PM22, the first power semiconductor module PM13, and the second power semiconductor module PM23 are inserted in a fitting manner.

Similarly to the alternating current output bus bar Bac(U), the alternating current output bus bars Bac(V), Bac(W) are also made of a conductive flat plate having a rectangular shape, and at the front end side, there are provided the insertion holes 29f into which the output terminals Tac of the first power semiconductor module PM11, the second power semiconductor module PM21, and the first power semiconductor module PM12 are inserted in a fitting manner. Moreover, in the alternating current output bus bars Bac(V), Bac(W), at the back end side, there are provided insertion holes 29r into which the output terminals Tac of the second power semiconductor module PM22, the first power semiconductor module PM13, and the second power semiconductor module PM23 are inserted in a fitting manner.

Then, in the laminate bus bar LB, on the insulation film 27, the negative electrode bus bar Bn is placed, on this negative electrode bus bar Bn, the intermediate bus bar Bm is placed with the insulation film 27 therebetween, and in the opening portions 28u, 28v, 28w of the intermediate bus bar Bm, the alternating current output bus bars Bac(U), Bac(V), Bac(W) are placed, respectively, with a predetermined space between each other. Further, on the intermediate bus bar Bm and the alternating current output bus bars Bac(U), Bac(V), Bac(W), the positive electrode bus bar Bp is placed with the insulation film 27 therebetween, and still further, on the positive electrode bus bar Bp, the insulation film 27 is placed. In this state, heating and pressure-welding are performed in a vertical direction, whereby the insulation films 27 are thermally welded so that the laminate bus bar LB is formed. Thus, the laminate bus bar LB is formed so that in the opening portions 28u, 28v, 28w of the intermediate bus bar Bm, the alternating current output bus bars Bac(U), Bac(V), Bac(W) are fixed while sealed at the periphery in an insulated manner by the insulation films 27.

Note that as the laminate bus bar, in place of that collectively formed as described above, laminate bus bars formed separately with respect to each bus bar may be laminated in order.

In other words, the negative electrode bus bar Bn is sandwiched between the insulation films 27, and in this state, heating and pressure-welding are performed in the vertical direction, whereby the insulation films 27 are thermally welded so that a laminate bus bar constituted by the negative electrode bus bar Bn is formed. Moreover, in the opening portions 28u, 28v, 28w of the intermediate bus bar Bm, the alternating current output bus bars Bac(U), Bac(V), Bac(W) are disposed, respectively, with a predetermined space between each other, which is then sandwiched by the insulation films 27, and in this state, heating and pressure-welding are performed in the vertical direction, whereby the insulation films 27 are thermally welded so that a laminate bus bar constituted by the intermediate bus bar Bm and the alternating current output bus bars Bac(U), Bac(V), Bac(W) is formed. Further, the positive electrode bus bar Bp is sandwiched between the insulation films 27, and in this state, heating and pressure-welding are performed in the vertical direction, whereby the insulation films 27 are thermally welded so that a laminate bus bar constituted by the positive electrode bus bar Bp is formed. The "a laminate bus bar constituted by the negative electrode bus bar Bn", the "laminate bus bar constituted by the intermediate bus bar Bm and the alternating current output bus bars Bac(U), Bac(V), Bac(W)", and the "laminate bus bar constituted by the positive electrode bus bar Bp" as thus formed may be laminated in order.

Note that coincidentally with thermal welding or after thermal welding, the insulation films 27 as plugging fitting holes into which the terminals Tp, Tn, Tac of the first power semiconductor modules PM11 to PM13 and the terminals Tm, Tac of the second power semiconductor modules PM21 to PM23 are fit are removed.

Then, the laminate bus bar LB having the configuration as described above is mounted on the U-phase output arm UA, the V-phase output arm VA, and the W-phase output arm WA in such a manner as to be penetrated by respective terminals. Note that as illustrated in FIG. 1, with respect to the positive electrode bus bar Bp and the negative electrode bus bar Bn, connection portions Bop and Bon are provided. The connection portions Bop and Bon project from the front end side, and are connected to exterior bus bars which are connected to a positive electrode and a negative electrode of the direct current power supply, respectively. With respect to each of the alternating current output bus bars Bac(U) to Bac(W), an exterior output bus bar (unillustrated) is electrically connected to any one of the output terminals Tac of the first power semiconductor modules PM11 to PM13 and the second power semiconductor modules PM21 to PM23, the output terminals Tac projecting from an upper surface of the laminate bus bar LB.

Thus, the laminate bus bar LB is mounted on the U-phase output arm UA, the V-phase output arm VA, and the W-phase output arm WA, whereby the positive electrode terminals Tp, the negative electrode terminals Tn, and the alternating current output terminals Tac of three sets of the first power semiconductor modules PM11 to PM13 are electrically connected to each other by the positive electrode bus bar Bp, the negative electrode bus bar Bn, and the alternating current output bus bar Bac, respectively, and the intermediate terminals Tm and the alternating current output terminals Tac of the second power semiconductor modules PM21 to PM23 are electrically connected to each other by the intermediate bus bar Bm and the alternating current output bus bar Bac, respectively so that the U-phase output arm UA, the V-phase output arm VA, and the W-phase output arm WA as illustrated in FIG. 7 can be separately configured.

Then, in the U-phase output arm UA, the V-phase output arm VA, and the W-phase output arm WA, with respect to each arm, the first power semiconductor modules PM11 to PM13 are simultaneously driven by separate gate signals for the first semiconductor switching element Q1 and the second semiconductor switching element Q2, and also the second power semiconductor modules PM21 to PM23 are simultaneously driven by separate gate signals for the third semiconductor switching element Q3 and the fourth semiconductor switching element Q4.

For example, in an operation of the U-phase output arm UA, four operation modes of a first operation mode, a second operation mode, a third operation mode, and a fourth operation mode, are repeated in order, whereby alternating current is outputted to a load.

In the first operation mode, in a state in which output current is zero, the third semiconductor switching elements Q3 of the second power semiconductor modules PM21 to PM23 are switching-controlled so that the output current is increased to a positive intermediate current value, and subsequently the first semiconductor switching elements Q1 of the first power semiconductor modules PM11 to PM13 is switching-controlled so that the output current is increased to a positive side maximum current value and then reduced the output current to a positive intermediate value.

In the second operation mode, from a positive intermediate current value, the third semiconductor switching elements Q3 of the second power semiconductor modules PM21 to PM23 are switching-controlled so that positive output current is reduced to near zero, and when switching control of the third semiconductor switching elements Q3 is stopped, free-wheeling current flows to a load side through the free-wheeling diodes D2 of the second semiconductor switching elements Q2 of the first power semiconductor modules PM11 to PM13, and output current returns to zero.

In the third operation mode, the fourth semiconductor switching elements Q4 of the second power semiconductor modules PM21 to PM23 are switching-controlled so that the output current is increased to a negative intermediate current value, and subsequently the second semiconductor switching elements Q2 of the first power semiconductor modules PM11 to PM13 is switching-controlled so that the output current is increased to a negative side maximum current value and then reduced to a negative intermediate value.

In the fourth operation mode, from a negative intermediate current value, the fourth semiconductor switching elements Q4 of the second power semiconductor modules PM21 to PM23 are switching-controlled so that negative output current is reduced to near zero, and when switching control of the fourth semiconductor switching elements Q4 is stopped, free-wheeling current flows to a power supply side through the free-wheeling diodes D1 of the first semiconductor switching elements Q1 of the first power semiconductor modules PM11 to PM13, and output current returns to zero.

Figure 8:
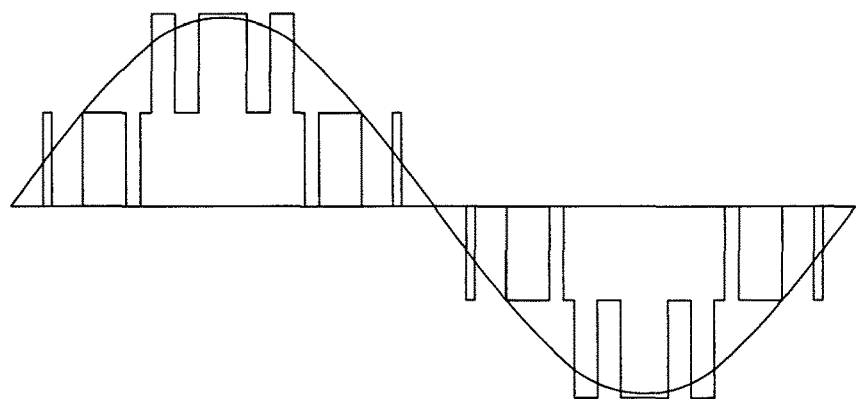
FIG. 8 is a signal waveform diagram illustrative of an output current waveform of the U-phase output arm.

Thus, the first operation mode to the fourth operation mode are repeatedly performed, whereby, as illustrated in FIG. 8, three-level alternating current output current can be formed.

Also in the V-phase output arm VA and the W-phase output arm WA, similar control is performed with phases delayed by 120 degrees and 240 degrees from the phase of the U-phase output arm UA, whereby three-level alternating current output current can be outputted.

Thus, according to the first embodiment as described above, in the recessed portions 21d provided to the module-mounting surface 21b of the module-mounting plate portion 21a of the cooling body 21, the first power semiconductor modules PM11 to PM13 and the second power semiconductor modules PM21 to PM23 are disposed in a staggered manner. Consequently, for example, the first power semiconductor module PM11 and the second power semiconductor module PM21 adjacent to each other can configure one set of U-phase arm.

Figure 9:
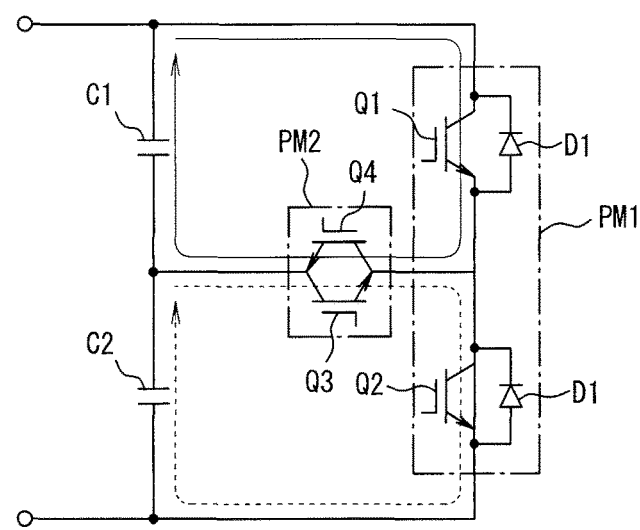
FIG. 9 is a diagram illustrative of a current path of the output arm.

Using this configuration, as illustrated in FIG. 9, a go-around loop in a switching operation is made up of a path going through the first capacitor C1, the first semiconductor switching element Q1, the fourth semiconductor switching element Q4, and the first capacitor C1 in this order during an upper arm switching operation and a path going through the second capacitor C2, the third semiconductor switching element Q3, the second semiconductor switching element Q2, and the second capacitor C2 in this order during a lower arm switching operation. A wiring inductance of these both paths can be made to be small, and a surge voltage at the time of turn off of the semiconductor switching elements Q1 to Q4 and a surge voltage at the time of reverse recovery of the free-wheeling diodes D1, D2 connected to the semiconductor switching elements Q1, Q2 in reverse parallel can be reduced.

Moreover, the first power semiconductor modules PM11 to PM13 and the second power semiconductor modules PM21 to PM23 are disposed in a staggered manner, whereby, for example, as in the U-phase output arm UA and the W-phase output arm WA, a wiring length between the first power semiconductor module PM13 serving as a main module and the first capacitor C1 and the second capacitor C2 can be made to be the shortest, which consequently enables reduction in wiring inductance.

Incidentally, when the first power semiconductor modules PM11 to PM13 and the second power semiconductor modules PM21 to PM23 are disposed in a manner similar to the conventional example, the second power semiconductor modules PM21 to PM23 are disposed between the first capacitor C1 and the second capacitor C2 and the first power semiconductor modules PM11 to PM13, whereby a wiring length between the first capacitor C1 and the second capacitor C2 and the first power semiconductor modules PM11 to PM13 increases by a length of the second power semiconductor modules PM21 to PM23 so that a wiring inductance increases.

Moreover, on the cooling body 21, there are provided a first module row Mr1 and a second module row Mr2 and the first power semiconductor modules PM11 to PM13 and the second power semiconductor modules PM21 to PM23 are disposed in such a manner as to face each other in a terminal disposition direction so that even in a case in which a plurality of first power semiconductor modules and second power semiconductor modules are connected to each other, a width of each of the output arms UA-WA can be made to be small.

Further, main circuit electrodes of the first power semiconductor modules PM11 to PM13 and the second power semiconductor modules PM21 to PM23 which constitute the U-phase output arm UA, the V-phase output arm VA, and the W-phase output arm WA are connected to each other by the laminate bus bar LB. This laminate bus bar LB is formed by laminating the positive electrode bus bar Bp, the negative electrode bus bar Bn, and the intermediate bus bar Bm, each of which includes the module-connecting flat plate portion 25, with the insulation films 27 respectively therebetween. Consequently, a width of at least the positive electrode bus bar Bp and the negative electrode bus bar Bn can be increased so that a self-inductance of each of the bus bars Bp, Bn can be reduced. In addition, a current flow direction in the positive electrode bus bar Bp and a current flow direction in the negative electrode bus bar Bn are opposite to each other so that a magnetic flux generated can be cancelled and with an inductance between the phases to be a negative value, the entirety of a wiring inductance can be further reduced.

The alternating current output bus bars Bac(U) to Bac(W) of the phase output arms UA to WA are disposed in an insulated manner in the opening portions 28u to 28W provided to the intermediate bus bar Bm so that the laminate bus bar LB can be configured to have a three-layer structure as a whole, a thickness and a weight of the laminate bus bar LB can be reduced, and the laminate bus bar LB can be reduced in size and weight.

Then, in the intermediate bus bar Bm, the opening portions 28u to 28W are provided so that a cross-sectional area which serves as a current path at these opening portions 28u to 28W reduces in size and a self-inductance increases. However, as illustrated in FIG. 9, the intermediate bus bar Bm relates to both a go-around loop as indicated by a solid line during an upper arm switching operation and a go-around loop as indicated by a dotted line during a lower arm switching operation, and a balance of both the go-around loops is maintained, and a stable operation can be secured.

Incidentally, also, opening portions may be provided to the positive electrode bus bar Bp or the negative electrode bus bar Bn and in these opening portions, the alternating current output bus bars Bac(U) to Bac(W) may be disposed in an insulated manner, but in this case, providing the opening portions allows an increase of a self-inductance to influence only the go-around loop during an upper arm switching operation or the go-around loop during a lower arm switching operation so that the balance of the go-around loop during an upper arm switching operation or the go-around loop during a lower arm switching operation is disturbed, and a stable operation can be no longer secured.

Moreover, on the cooling body 21, the first power semiconductor modules PM11 to PM13 and the second power semiconductor modules PM21 to PM23 are disposed in a staggered manner so that when a device power factor is high, the first power semiconductor modules PM11 to PM13 disposed in a staggered manner generates more heat, and when the device power factor is low, the second power semiconductor modules PM21 to PM23 similarly disposed in a staggered manner generates more heat. Consequently, a distance between power semiconductor modules which generate heat at the same time can be configured to be long, and the power semiconductor modules which generate heat on a cooling body are dispersed so that temperature increase of a semiconductor device incorporated in the power semiconductor modules can be restrained. Thus, a distance between the first power semiconductor module and the second power semiconductor module adjacent to each other can be shortened and the cooling body 21 can be made to be small so that an optimal design can be made.

Note that in the first embodiment as described above, with respect to each of the U-phase output arm UA, the V-phase output arm VA, and the W-phase output arm WA, a case in which the first power semiconductor modules PM11 to PM13 and the second power semiconductor modules PM21 to PM23 are disposed in the same staggered manner has been described, which is, however, not limitative.

Figure 10:
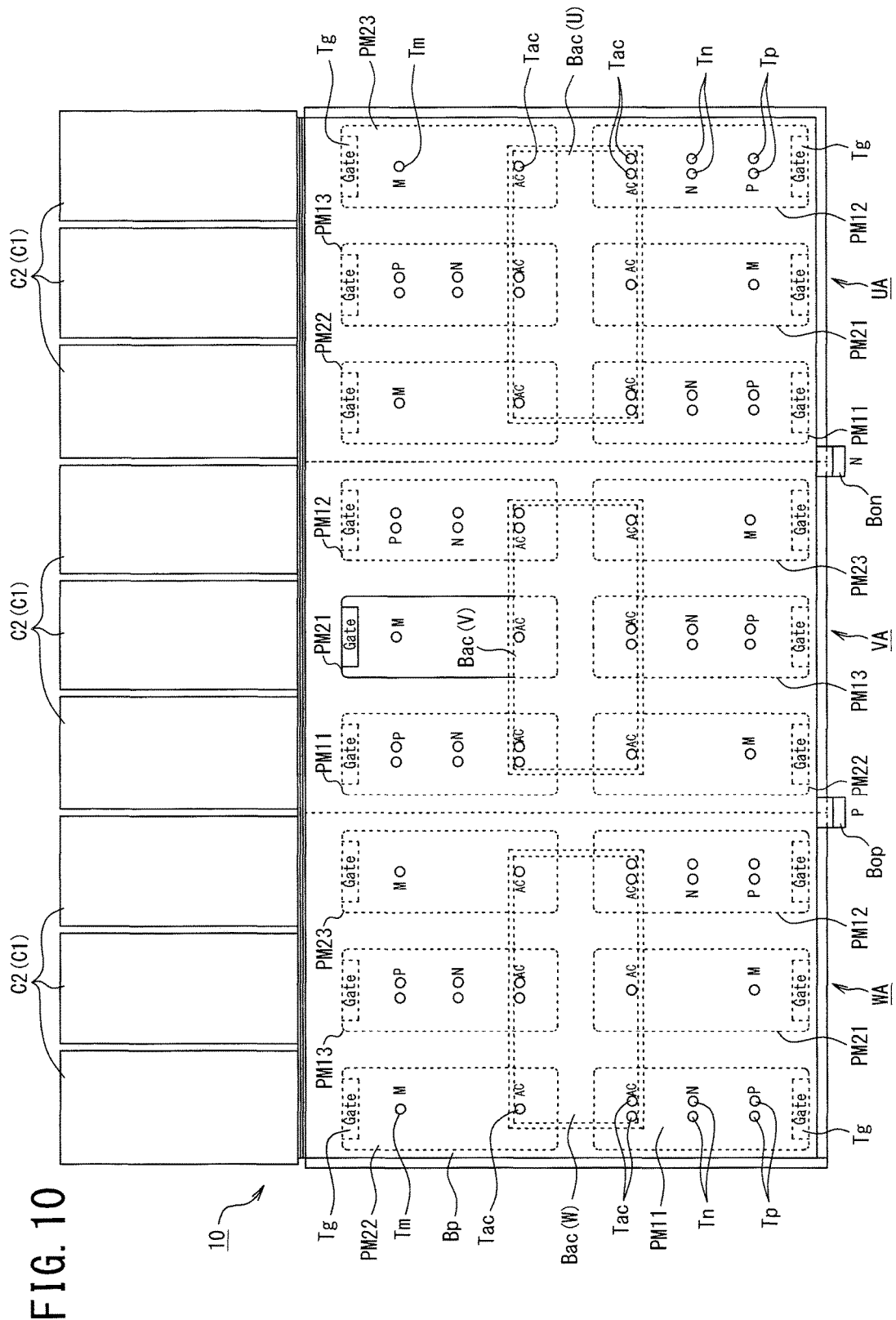
FIG. 10 is a plan view illustrative of a modification example of the three-level three-phase power conversion device of the present invention.

For example, the first module row Mr1 and the second module row Mr2 of the V-phase output arm VA are replaced with each other in a front-back manner so that, as illustrated in FIG. 10, when the U-phase output arm UA, the V-phase output arm VA, and the W-phase output arm WA are arranged, the first power semiconductor modules PM11 to PM13 and the second power semiconductor modules PM21 to PM23 can be disposed in a staggered manner as a whole.

Moreover, in the first embodiment as described above, a case in which the first power semiconductor modules PM11 to PM13 and the second power semiconductor modules PM21 to PM23 are disposed in a staggered manner on the cooling body 21 has been described, which is, however, not limitative, and the second power semiconductor modules PM21 to PM23 may be disposed at a capacitor disposition side of the cooling body 21 and the alternating current output terminals Tac are at a side opposite to the capacitor disposition side, and the first power semiconductor modules PM11 to PM13 maybe disposed at a side opposite to the capacitors and the alternating current output terminals Tac face the alternating current output terminals Tac of the second power semiconductor modules PM21 to PM23.

Figure 11A:
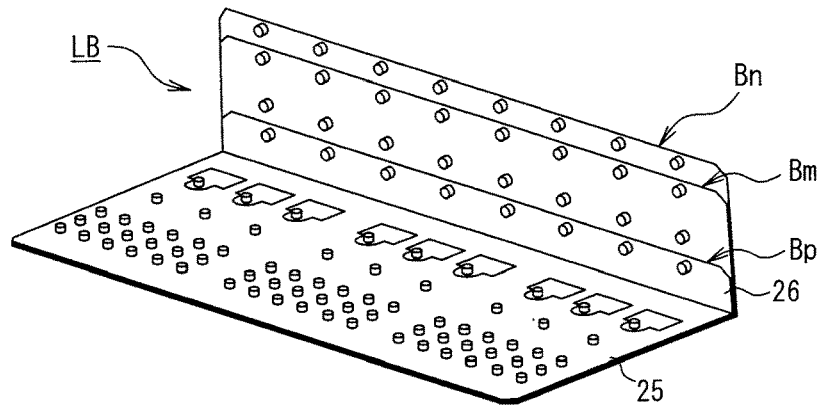
Figure 11B:
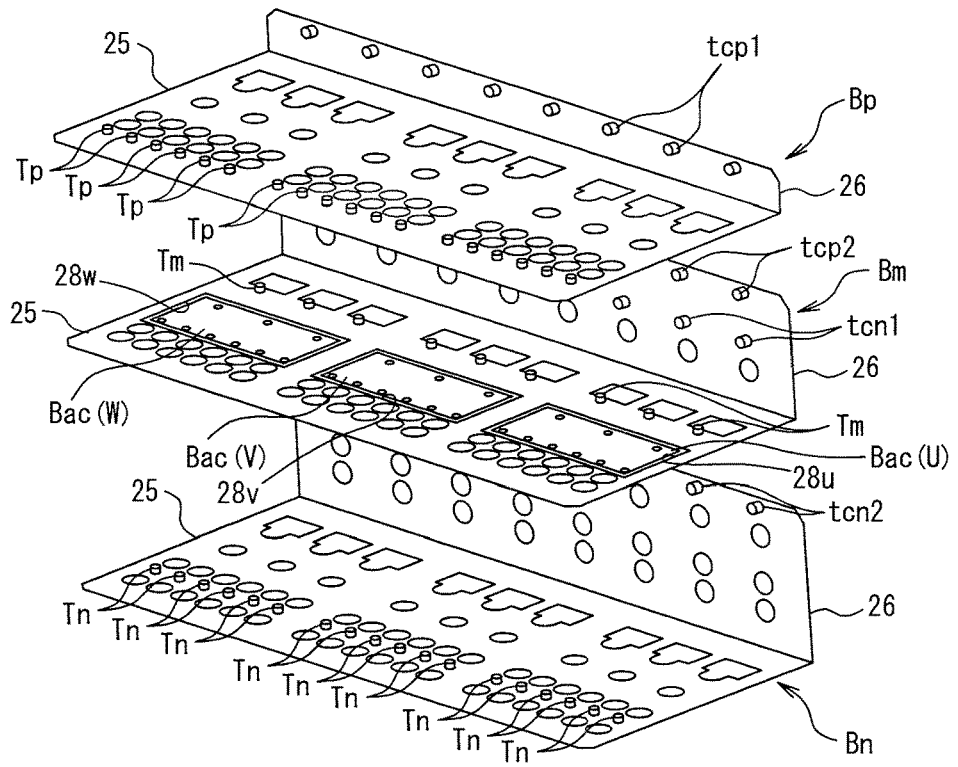

In this case, as illustrated in FIGS. 11A and 11B, in the laminate bus bar LB, hole shapes are configured in such a manner as to correspond to each main circuit electrode of the first power semiconductor modules PM11 to PM13 and the second power semiconductor modules PM21 to PM23, whereby, similarly to the first embodiment as described above, an effect of further reducing a wiring inductance can be obtained.

Moreover, in the first embodiment as described above, a case in which the present invention is applied to the three-level three-phase power conversion device 10 has been described, which is, however, not limitative, and the present invention can be also applied to a three-level single-phase power conversion device.

Figure 12:
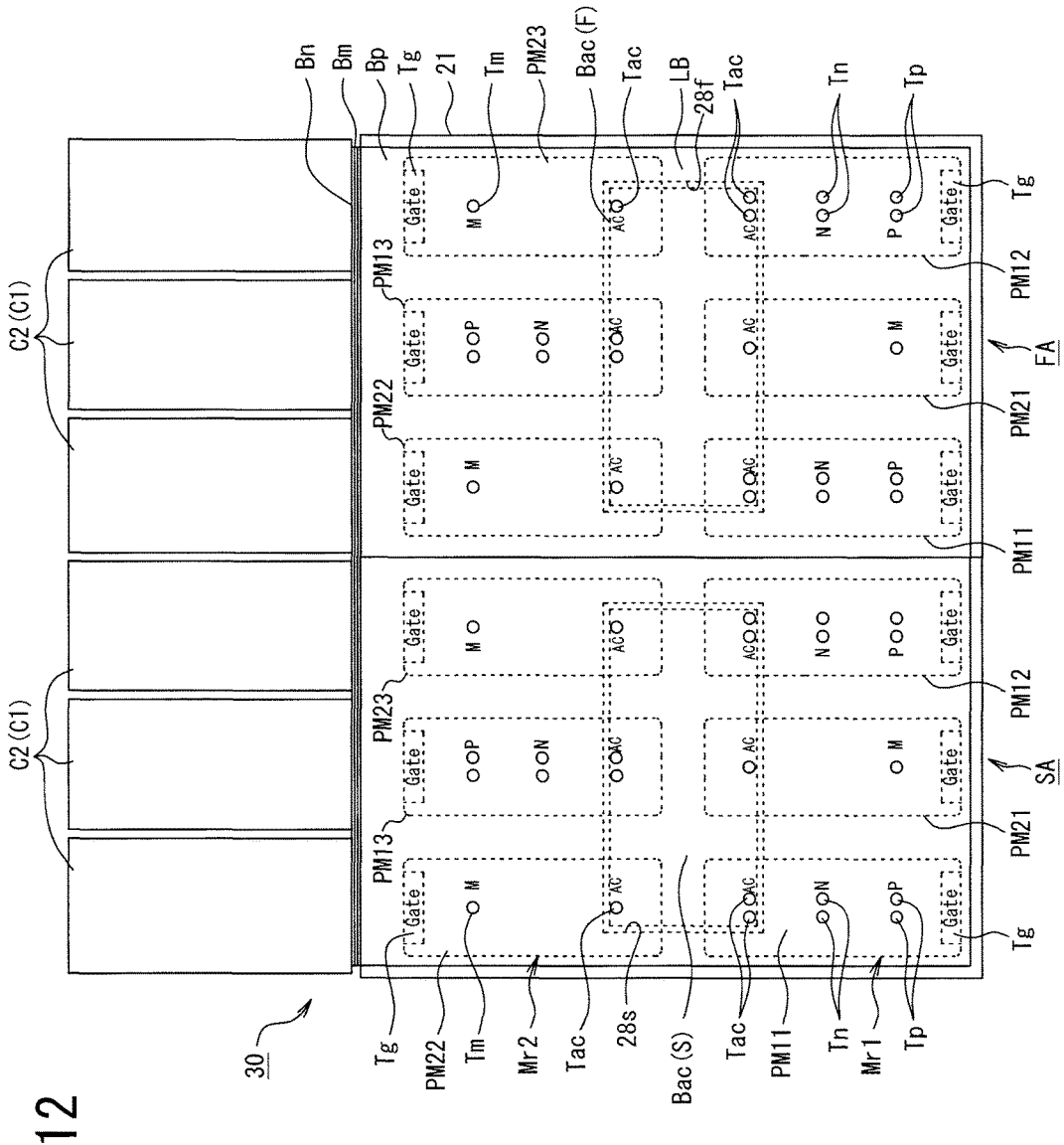
FIG. 12 is a plan view illustrative of a three-level single-phase power conversion device of the present invention.
Figure 13:
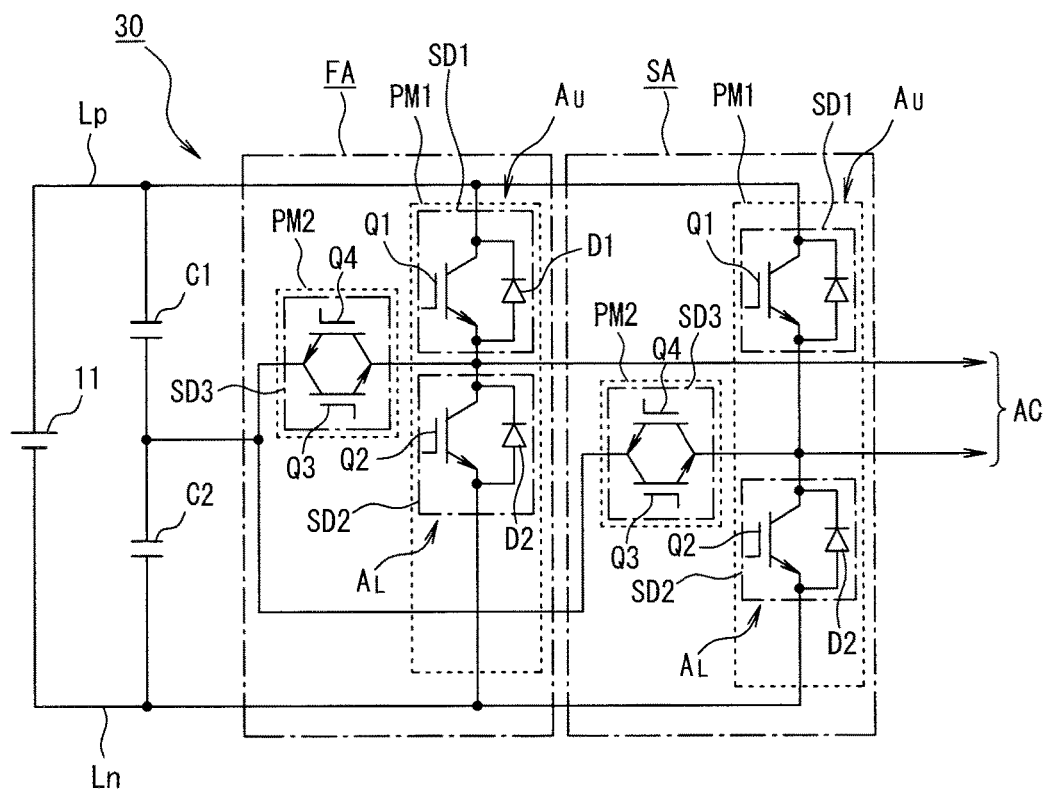
FIG. 13 is a circuit diagram illustrative of an equivalent circuit diagram of FIGS. 11A and 11B.

As illustrated in FIGS. 12 and 13, in this three-level single-phase power conversion device 30, an output arm for one phase (e.g., W phase) of the three-level three-phase power conversion device 10 as described above is omitted, and for example, the U-phase output arm UA is configured to be a first output arm FA and the V-phase output arm VA is configured to be a second output arm SA and then these two sets of output arms are connected to each other in parallel to form an H-bridge circuit.

Similarly to FIG. 7 according to the first embodiment as described above, each of the first output arm FA and the second output arm SA is constituted by the plurality of first power semiconductor modules PM11 to PM13 and the plurality of second power semiconductor modules PM21 to PM23.

Then, as illustrated in FIG. 12, in the first output arm FA, at a front row on the cooling body 21, there are disposed from a left side the first power semiconductor module PM11, the second power semiconductor module PM21, and the first power semiconductor module PM12 in this order, and at a back row, there are disposed the second power semiconductor module PM22, the first power semiconductor module PM13, and the second power semiconductor module PM23 in this order.

Moreover, the first power semiconductor modules PM11 to PM13 and the second power semiconductor modules PM21 to PM23 of the first output arm FA and the second output arm SA are connected to each other by the positive electrode bus bar Bp, the negative electrode bus bar Bn, the intermediate bus bar Bm, and alternating current output bus bars Bac(F), Bac(S) as laminated of the laminate bus bar LB.

Herein, similarly to the first embodiment as described above, the alternating current output bus bars Bac(F), Bac(S) are held in a manner insulated by the insulation films 27 in opening portions 28f, 28s provided in the intermediate bus bar Bm at positions corresponding to the output terminals Tac of the first power semiconductor modules PM11 to PM13 and the second power semiconductor modules PM21 to PM23. Each of the alternating current output bus bars Bac(F), Bac(S) is provided with insertion holes into which the output terminals Tac are inserted in a fitting manner. In each of the alternating current output bus bars Bac(F), Bac(S), although unillustrated, to any of the output terminals Tac which project from a surface of the laminate bus bar LB, an exterior bus bar for output is connected.

Also this three-level single-phase power conversion device 30 can obtain same operational effects as those of the first embodiment, since the first power semiconductor modules PM11 to PM13 and the second power semiconductor modules PM21 to PM23 which constitute the first output arm FA and the second output arm SA are disposed in a staggered manner similar to the first embodiment except that one phase in the first embodiment as described above is omitted and a three-level single-phase alternating current output in place of a three-level three-phase alternating current output can be obtained.

Next, a second embodiment of the power conversion device of the present invention will be described with reference to FIGS. 14 to 17.

In this second embodiment, in the first embodiment as described above in which the first power semiconductor modules PM11 to PM13 and the second power semiconductor modules PM21 to PM23 are disposed in a staggered manner, a snubber circuit-incorporated chip which incorporates a snubber circuit is connected.

In other words, in the second embodiment, with respect to each arm of the U-phase output arm UA, the V-phase output arm VA, and the W-phase output arm WA, a snubber circuit-incorporated chip 31 which incorporates a snubber circuit is connected between the first power semiconductor module PM1 and the second power semiconductor module PM2 adjacent to each other in an arrangement direction. In this second embodiment, the V-phase output arm VA will be described by way of example. Note that in FIG. 14, the laminate bus bar LB is indicated by a virtual line of two-dot chain line.

Figure 14:
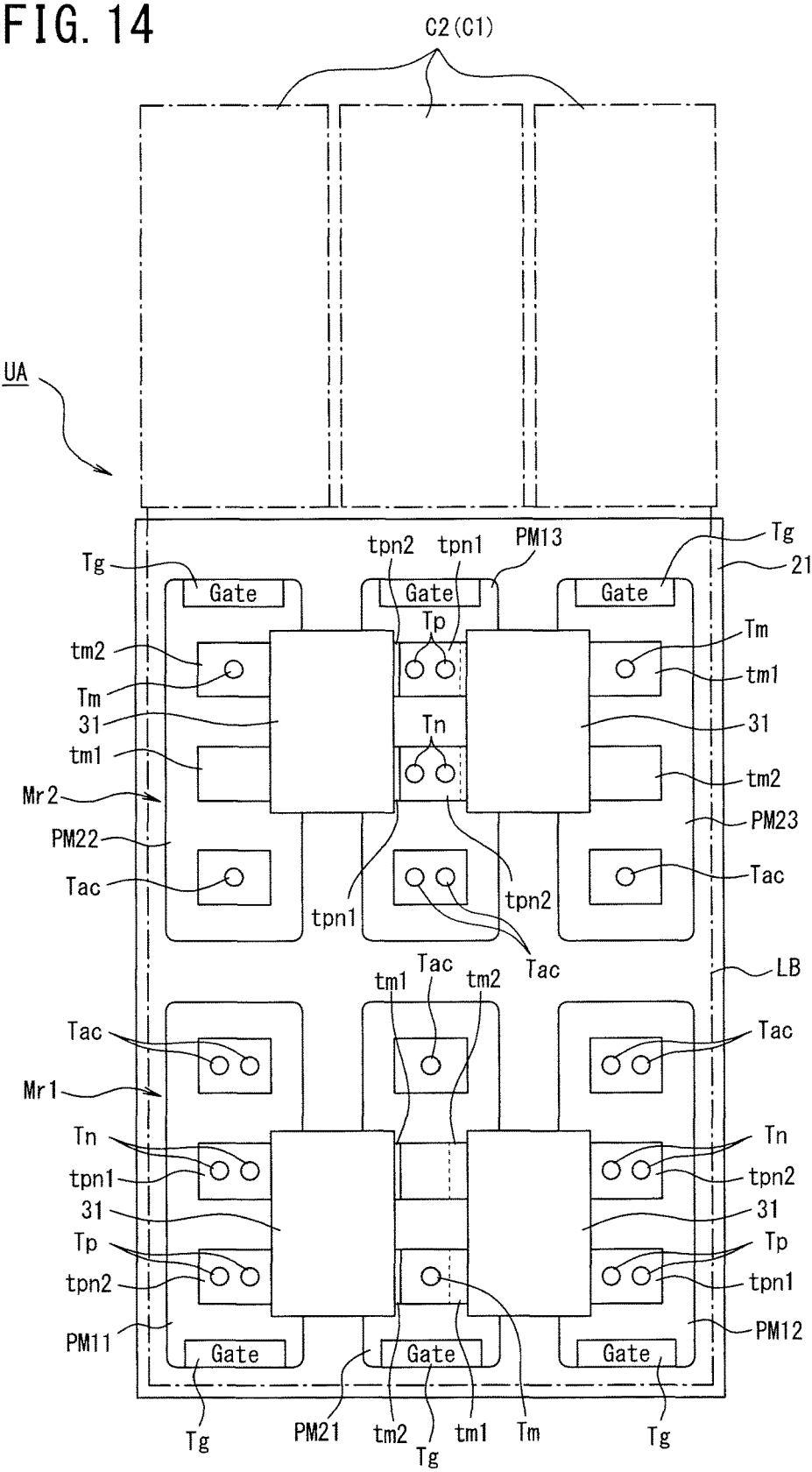
FIG. 14 is a plan view of one phase illustrative of a second embodiment of the power conversion device of the present invention.

The snubber circuit-incorporated chip 31 is a four-terminal semiconductor chip and, as illustrated in FIG. 14, includes first positive/negative electrode terminals tpn1, second positive/negative electrode terminals tpn2, a first intermediate terminal tm1, and a second intermediate terminal tm2. The first positive/negative electrode terminals tpn1 are electrically connected to one of the positive electrode terminals Tp and the negative electrode terminals Tn of the first power semiconductor module PM1. The second positive/negative electrode terminals tpn2 are electrically connected to the other of the positive electrode terminals Tp and the negative electrode terminals Tn of the first power semiconductor module PM1. The first intermediate terminal tm1 or the second intermediate terminal tm2 is electrically connected to the intermediate terminal Tm of the second power semiconductor module PM2.

Figure 15:
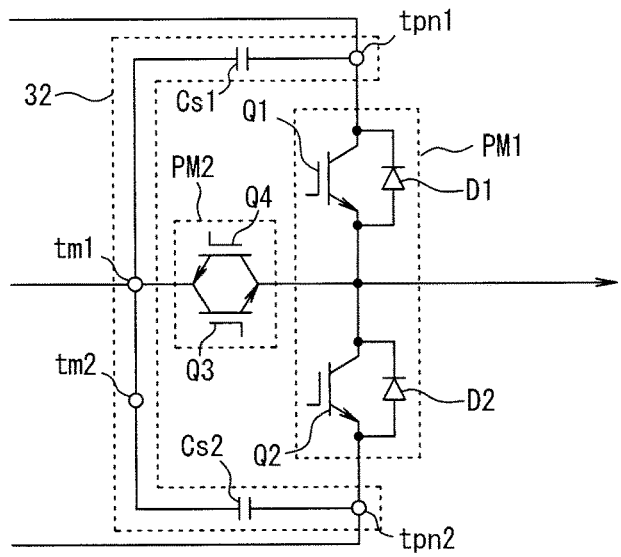
FIG. 15 is a circuit diagram illustrative of a C-type snubber circuit which can be applied to the second embodiment.
Figure 16:
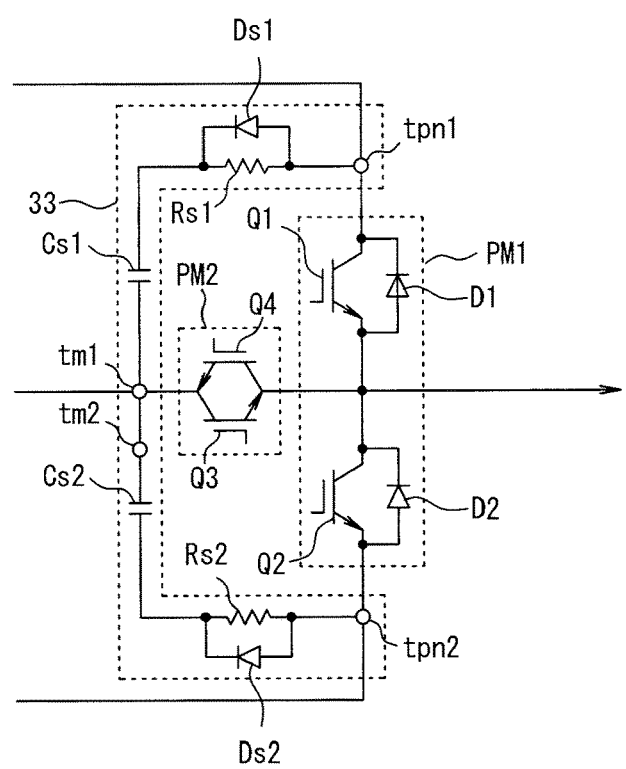
FIG. 16 is a circuit diagram illustrative of a RCD-type snubber circuit which can be applied to the second embodiment.

As the snubber circuit incorporated in the snubber circuit-incorporated chip 31, a C-type snubber circuit 32 as illustrated in FIG. 15 and an RCD-type snubber circuit 33 as illustrated in FIG. 16 can be employed, but limitation is not made to the C-type snubber circuit or the RCD snubber circuit and the other various snubber circuits can be employed.

As illustrated in FIG. 15, the C-type snubber circuit 32 includes a first snubber capacitor Cs1 connected between the first positive/negative electrode terminal tpn1 and the first intermediate terminal tm1 and a second snubber capacitor Cs2 connected between the second positive/negative electrode terminal tpn2 and the second intermediate terminal tm2. Moreover, in the C-type snubber circuit 32, the first intermediate terminal tm1 and the second intermediate terminal tm2 are electrically interconnected directly.

As illustrated in FIG. 16, the RCD-type snubber circuit 33 includes the first snubber capacitor Cs1 and a first snubber resistance Rs1 which are connected in series between the first positive/negative electrode terminal tpn1 and the first intermediate terminal tm1 and a first snubber diode Ds1 connected to the first snubber resistance Rs1 in parallel. In the first snubber diode Ds1, an anode is connected to a connection point between the first positive/negative electrode terminal tpn1 and the first snubber resistance Rs1, and a cathode is connected to a connection point between the first snubber resistance Rs1 and the first snubber capacitor Cs1.

Moreover, the RCD-type snubber circuit 33 includes the second snubber capacitor Cs2 and a second snubber resistance Rs2 which are connected in series between the second positive/negative electrode terminal tpn2 and the second intermediate terminal tm2 and a second snubber diode Ds2 connected to the second snubber resistance Rs2 in parallel. In the second snubber diode Ds2, an anode is connected to a connection point between the second positive/negative electrode terminal tpn2 and the second snubber resistance Rs2, and a cathode is connected to a connection point between the second snubber resistance Rs2 and the second snubber capacitor Cs2.

Further, in the RCD-type snubber circuit 33, the first intermediate terminal tm1 and the second intermediate terminal tm2 are electrically interconnected directly.

Then, as illustrated in FIG. 14, the four snubber circuit-incorporated chips 31 are connected, for example, by soldering, among first power semiconductor modules PM11 to PM13 and second power semiconductor modules PM21 to PM23 which constitute the V-phase output arm VA.

In other words, between the first power semiconductor module PM11 and the second power semiconductor module PM21, the snubber circuit-incorporated chip 31 electrically connects the first positive/negative electrode terminals tpn1 to the negative electrode terminals Tn of the first power semiconductor module PM11, electrically connects the second positive/negative electrode terminals tpn2 to the positive electrode terminals Tp of the first power semiconductor module PM11, and connects the second intermediate terminal tm2 to the intermediate terminal Tm of the second power semiconductor module PM21. The first intermediate terminal tm1 is in a state of non-connection.

Similarly, between the first power semiconductor module PM12 and the second power semiconductor module PM21, the snubber circuit-incorporated chip 31 electrically connects the first positive/negative electrode terminals tpn1 to the positive electrode terminals Tp of the first power semiconductor module PM12, electrically connects the second positive/negative electrode terminals tpn2 to the negative electrode terminals Tn of the first power semiconductor module PM12, and connects the first intermediate terminal tm1 to the intermediate terminal Tm of the second power semiconductor module PM21. The second intermediate terminal tm2 is disposed over the second intermediate terminal tm2 of the adjacent snubber circuit-incorporated chip 31 with an insulation member therebetween and is in a state of non-connection.

Moreover, between the first power semiconductor module PM13 and the second power semiconductor module PM22, the snubber circuit-incorporated chip 31 electrically connects the first positive/negative electrode terminals tpn1 to the negative electrode terminals Tn of the first power semiconductor module PM13, electrically connects the second positive/negative electrode terminals tpn2 to the positive electrode terminals Tp of the first power semiconductor module PM13, and connects the second intermediate terminal tm2 to the intermediate terminal Tm of the second power semiconductor module PM22. The first intermediate terminal tm1 is in a state of non-connection.

Further, between the first power semiconductor module PM13 and the second power semiconductor module PM23, the snubber circuit-incorporated chip 31 electrically connects the first positive/negative electrode terminals tpn1 to the positive electrode terminals Tp of the first power semiconductor module PM13, electrically connects the second positive/negative electrode terminals tpn2 to the negative electrode terminals Tn of the first power semiconductor module PM13, and connects the first intermediate terminal tm1 to the intermediate terminal Tm of the second power semiconductor module PM23. The second intermediate terminal tm2 is in a state of non-connection.

According to this second embodiment, similarly to the first embodiment as described above, the first power semiconductor modules PM11 to PM13 and the second power semiconductor modules PM21 to PM23 are disposed in a staggered manner on the cooling body 21. Thus, at the first module row Mr1, the first power semiconductor module PM11, the second power semiconductor module PM21, and the first power semiconductor module PM12 are aligned in order in such a manner that respective side surfaces face each other. Moreover, at the second module row Mr2, the second power semiconductor module PM22, the first power semiconductor module PM13, and the second power semiconductor module PM23 are aligned in order in such a manner that respective side surfaces face each other.

Then, the snubber circuit-incorporated chip 31 is configured to be a four-terminal chip including the first positive/negative electrode terminals tpn1, the second positive/negative electrode terminals tpn2, the first intermediate terminal tm1, and the second intermediate terminal tm2.

Thus, in the second embodiment, in addition to the effects of the first embodiment, amounting area in which the snubber circuit-incorporated chip 31 is mounted can be secured between the first power semiconductor module PM1 and the second power semiconductor module PM2 adjacent to each other. Further, a wiring distance between the snubber circuit-incorporated chip 31 and the first power semiconductor module PM1 and the second power semiconductor module PM2 is configured to be the shortest so that a wiring inductance can be made to be small. Consequently, a configuration of the three-level power conversion device can be made to be small and improvement in efficiency is enabled.

Figure 17:
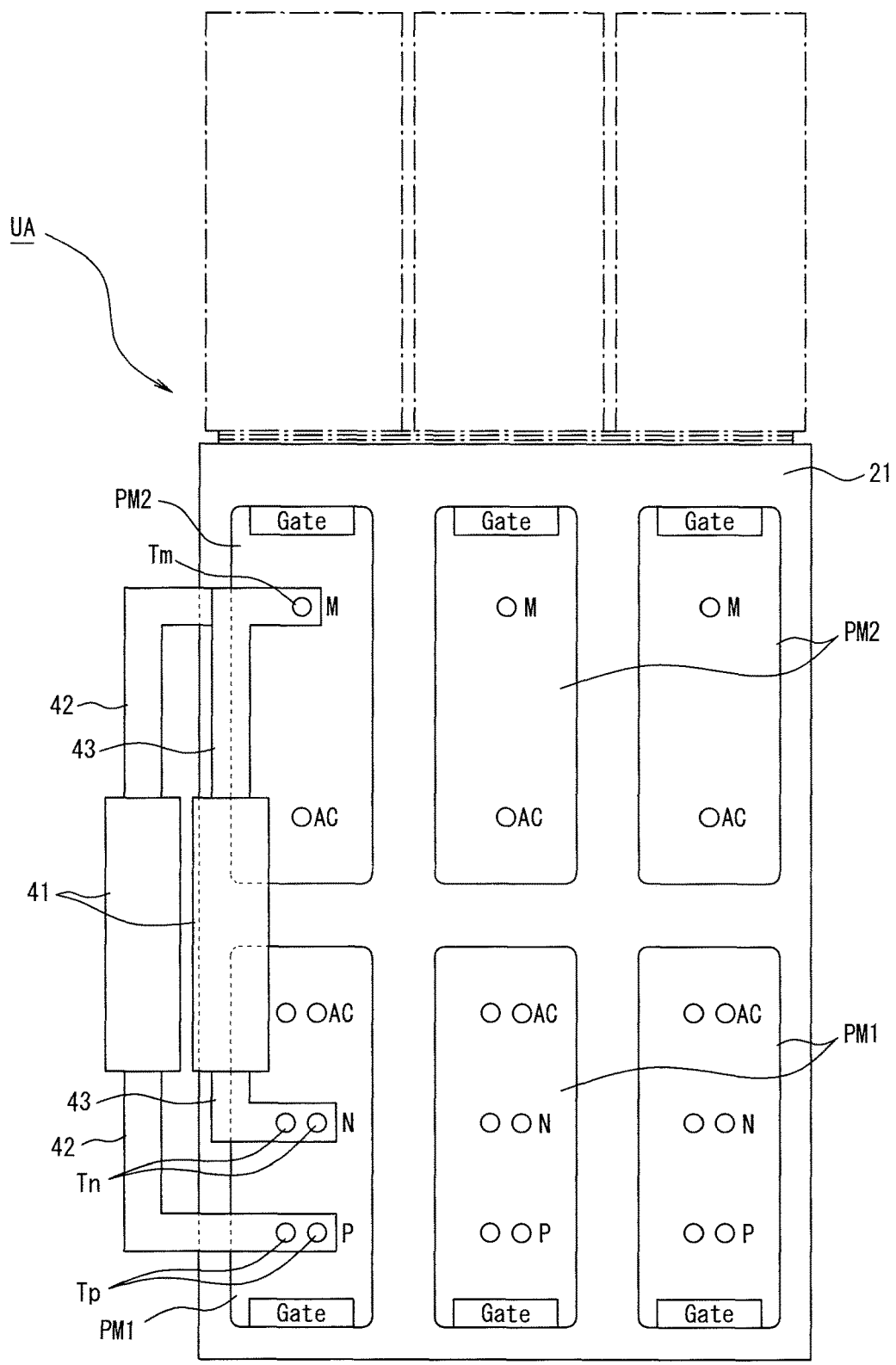
FIG. 17 is a plan view in a case in which a snubber circuit-incorporated chip is applied to a conventional example.

Incidentally, when the first power semiconductor module PM1 and the second power semiconductor module PM2 are separately disposed in a manner similar to the conventional example, as illustrated in FIG. 17, in connecting a snubber circuit-incorporated chip, a four-terminal snubber circuit-incorporated chip cannot be employed, but it is required to dispose two two-terminal snubber circuit-incorporated chips 41 in parallel and connect these snubber circuit-incorporated chips 41 between the first power semiconductor module PM1 and the second power semiconductor module PM2 using bus bars 42, 43.

In other words, the snubber circuit-incorporated chips 41 are connected at the longest distance between an outer side position of the first power semiconductor module PM1 and an outer side position of the second power semiconductor module PM2 and at the second longest distance between an intermediate position of the first power semiconductor module PM1 and the outer side position of the second power semiconductor module PM2 through the bus bars 42, 43, respectively. Consequently, amounting area of the snubber circuit-incorporated chips 41 is large so that reduction in size of the three-level power conversion device is difficult. Moreover, there is a problem that a wiring parasitic inductance becomes high so that surge voltage restraint by a snubber circuit becomes difficult to be effective, reduction in element loss by high speeding is difficult, and improvement in efficiency of the three-level power conversion device is difficult.

In contrast, in the second embodiment as described above, a snubber circuit-incorporated chip can be disposed between the first power semiconductor module PM1 and the second power semiconductor module PM2 adjacent to each other and arranged in parallel, and the problem of the conventional example as described above can be solved.

The first and second embodiments of the present invention has been described above, to which, however, the present invention is not limited, but the present invention can be modified and improved in various ways.

For example, a laminating order in the laminate bus bar LB is not limited to a case of the negative electrode bus bar Bn, the intermediate bus bar Bm, and the positive electrode bus bar Bp from a lower side, but the positive electrode bus bar Bp, the negative electrode bus bar Bn, and the intermediate bus bar Bm can be laminated in an optional order with an insulation member respectively therebetween.

Moreover, in a disposition of the first power semiconductor modules PM11 to PM13 and the second power semiconductor modules PM21 to PM23 in the U-phase output arm UA, the W-phase output arm WA, and the V-phase output arm VA, the first module row Mr1 and the second module row Mr2 may be replaced with each other to be reversely disposed, by exchanging the front and rear positions.

Further, as the semiconductor switching elements Q1 to Q4 incorporated in the first power semiconductor module PM1 and the second power semiconductor module PM2, not only an IGBT but also a MOSFET may be employed, and the switching elements Q1 to Q4 are not limited to such a case as to be made of Si, but at least a part of the semiconductor switching elements may be constituted by a power semiconductor device made of SiC, GaN, or the other wide band gap semiconductors.

Figure 18:
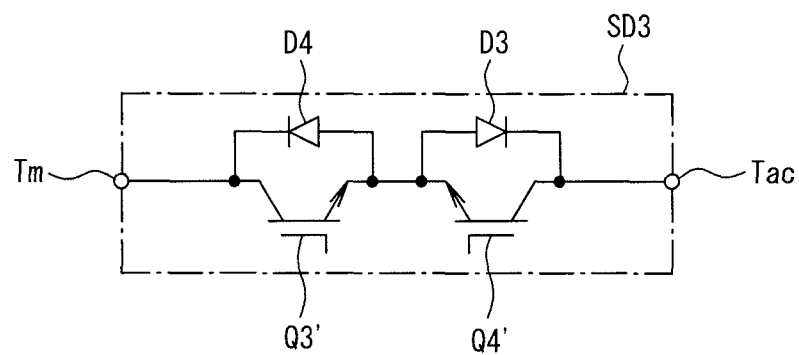
FIG. 18 is a circuit diagram illustrative of a modification example of a second power semiconductor module.

Moreover, the bi-directional semiconductor device SD3 incorporated in the second power semiconductor module PM2 is not limited to such a case as to include the reverse blocking semiconductor switching elements Q3, Q4, but, as illustrated in FIG. 18, may include a series circuit of a bi-directional semiconductor switching element Q3' and a diode D3 and a series circuit of a series circuit of a bi-directional semiconductor switching element Q4' and a diode D4 which is connected to this series circuit in parallel. In this case, the bi-directional semiconductor switching element Q3' and the diode D4 are connected to each other in parallel and the bi-directional semiconductor switching element Q4' and the diode D3 are connected to each other in parallel.

Moreover, the first power semiconductor module PM1 and the second power semiconductor module PM2 are not limited to such a case as to be formed into an identical size, but may be formed into sizes different from each other.

Further, a number of connection sets of the first power semiconductor module PM1 and the second power semiconductor module PM2 which constitute an output arm is not limited to three but may be two, or four or more.

In addition, the laminate bus bar LB is not required to be formed over a plurality of phases in a manner of the above embodiments, but may be formed to be divided for each phase. The positive electrode bus bar Bp, the intermediate bus bar Bm, and the negative electrode bus bar Bn which constitute laminate bus bar LB are not limited to such a case as to be formed into a flat plate shape, but may be formed into a lattice shape or into a belt shape for each phase.

Further, each of the positive electrode bus bar Bp, the negative electrode bus bar Bn, and the intermediate bus bar Bm has been illustrated to be formed to have a L-shaped cross section using the module-connecting flat plate portion 25 and the capacitor-connecting bent portion 26 bent upward from the back end portion of this module-connecting flat plate portion 25, but the module-connecting flat plate portion 25 and the capacitor-connecting bent portion 26 may be on the same plane without bending the capacitor-connecting bent portion 26 upward. In this case, the capacitors C1, C2 are disposed next to the cooling body 21 and positive and negative electrodes of each capacitor and each bus bar are electrically connected to each other.

Moreover, the present invention is not limited to a three-level power conversion device, but can be also applied to a multi-level power conversion device of four or more levels including output arms in which the first power semiconductor module PM1 and the second power semiconductor module PM2 are combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST 10 three-level three-phase power conversion device
UA U-phase output arm
VA V-phase output arm
WA W-phase output arm
PM1, PM11 to PM13 first power semiconductor module
PM2, PM21 to PM23 second power semiconductor module
Tp positive electrode terminal
Tn negative electrode terminal
Tac output terminal
Tm intermediate terminal
21 cooling body
Mr1 first module row
Mr2 second module row
Bp positive electrode bus bar
Bn negative electrode bus bar
Bm intermediate bus bar
Bac1(U) to Bac1(W), Bac2(U) to Bac2(W) alternating current output bus bar
25 module-connecting flat plate portion
26 capacitor-connecting bent portion
27 insulation film
28$u$ to 28$w$ opening portion
29$f$, 29$r$ insertion hole
C1 first capacitor
C2 second capacitor
30 three-level single-phase power conversion device
31 snubber circuit-incorporated chip
tpn1 first positive or negative electrode terminal
tpn2 second positive or negative electrode terminal
tm1 first intermediate terminal
tm2 second intermediate terminal
32 C-type snubber circuit
33 RCD-type snubber circuit

The invention claimed is:

1. A power conversion device comprising:
a first capacitor and a second capacitor which are connected to a direct current power supply in series;
a plurality of first power semiconductor modules incorporating a series circuit of a first semiconductor device and a second semiconductor device in which a positive electrode terminal, a negative electrode terminal, and an output terminal are disposed on one surface;
a plurality of second power semiconductor modules incorporating a bi-directional semiconductor device in which an intermediate terminal and an output terminal are disposed on one surface; and
a laminated bus bar connecting terminals of the first capacitor and the second capacitor and the terminals of the plurality of first power semiconductor modules and the plurality of second power semiconductor modules,
wherein the first power semiconductor modules and the second power semiconductor modules are disposed in such a manner that the respective output terminals face each other in a disposition direction of the terminals,
the laminated bus bar is formed by laminating a positive electrode bus bar which connects the first capacitor and the positive electrode terminals of the first power semiconductor modules to a positive electrode of the direct current power supply, the negative electrode bus bar which connects the second capacitor and the negative electrode terminals of the first power semiconductor modules to a negative electrode of the direct current power supply, and an intermediate bus bar which connects connection points of the first capacitor and the second capacitor and the intermediate terminals of the second power semiconductor modules, with the insulation films respectively therebetween, and
an output bus bar connecting the output terminals of the first power semiconductor modules and the second power semiconductor modules to each other is held in an insulated manner in an opening portion provided to the intermediate bus bar.

2. The power conversion device according to claim 1, wherein the intermediate bus bar is disposed between the positive electrode bus bar and the negative electrode bus bar.

3. The power conversion device according to claim 1, wherein the laminated bus bar includes a laminate bus bar.

4. The power conversion device according to claim 1, wherein the first power semiconductor modules and the second power semiconductor modules are respectively disposed in a staggered manner on a mounting surface of a cooling body.

5. The power conversion device according to claim 1, wherein a mounting surface of the cooling body is provided with a first module row at which the first power semiconductor modules and the second power semiconductor modules are alternately aligned and a second module row at which at positions facing the first power semiconductor modules at the first module row, the second power semiconductor modules are disposed and at positions facing the second power semiconductor modules, the first power semiconductor modules are disposed.

6. The power conversion device according to claim 1, wherein a mounting surface of a cooling body is provided with a first module row at which the plurality of first power semiconductor modules are disposed to be aligned and a second module row at which at positions facing the first power semiconductor modules at the first module row, the plurality of second power semiconductor modules are disposed to be aligned.

7. The power conversion device according to claim 1, wherein three sets of an output arm including the first power semiconductor module and the second power semiconductor module are connected to each other to form a three-level three-phase inverter.

8. The power conversion device according to claim 7, wherein the output arm is formed by connecting the plurality of first power semiconductor modules and second power semiconductor modules to each other in parallel.

9. The power conversion device according to claim 1, wherein at least one of the first semiconductor device, the second semiconductor device, and the bi-directional semiconductor device is configured to include a wide band gap semiconductor element.

* * * * *